United States Patent
Meo et al.

(10) Patent No.: US 10,101,534 B2
(45) Date of Patent: Oct. 16, 2018

(54) OPTICAL-FIBER FUSION-SPLICING DEVICE

(71) Applicant: SEI OPTIFRONTIER CO., LTD., Yokohama-shi, Kanagawa (JP)

(72) Inventors: Ryosuke Meo, Yokohama (JP); Kazufumi Joko, Yokohama (JP); Makoto Miyamori, Yokohama (JP); Toshihiko Homma, Yokohama (JP)

(73) Assignee: SEI OPTIFRONTER CO., LTD., Yokohama-shi, Kanagawa (JP)

( * ) Notice: Subject to any disclaimer, the term of this patent is extended or adjusted under 35 U.S.C. 154(b) by 175 days.

(21) Appl. No.: 15/114,542

(22) PCT Filed: Nov. 26, 2014

(86) PCT No.: PCT/JP2014/081231
§ 371 (c)(1),
(2) Date: Jul. 27, 2016

(87) PCT Pub. No.: WO2015/114926
PCT Pub. Date: Aug. 6, 2015

(65) Prior Publication Data
US 2016/0341897 A1 Nov. 24, 2016

(30) Foreign Application Priority Data
Jan. 28, 2014 (JP) .................. 2014-013549

(51) Int. Cl.
*G02B 6/255* (2006.01)
*G02B 6/00* (2006.01)

(52) U.S. Cl.
CPC ............. *G02B 6/2553* (2013.01); *G02B 6/00* (2013.01); *G02B 6/255* (2013.01)

(58) Field of Classification Search
CPC .................................................... G02B 6/255
See application file for complete search history.

(56) References Cited

U.S. PATENT DOCUMENTS 4,274,707 A * 6/1981 Pacey .................. G02B 6/2551
219/121.58
4,460,820 A * 7/1984 Matsumoto ............. B29C 61/00
174/DIG. 8

(Continued)

FOREIGN PATENT DOCUMENTS

| JP | H02-73602 U | 6/1990 |
| JP | H04-024705 U | 2/1992 |

(Continued)

*Primary Examiner* — Cynthia Szewczyk
(74) *Attorney, Agent, or Firm* — Drinker Biddle & Reath LLP

(57) ABSTRACT

An optical-fiber fusion-splicing device includes: a first heating device in which a fusion-splicing operation of heating and fusing abutting parts of at least a pair of optical fibers with end faces brought into contact with each other is performed; a second heating device in which a reinforcing operation of heating and shrinking a heat-shrinkable resin which covers a site where the optical fibers are fusion-spliced to each other is performed; and a CPU which controls the first heating device and the second heating device, wherein the CPU preheats a heater of the second heating device so as to reach a predetermined first temperature, if the CPU receives a heating end signal from the first heating device, and thereafter, heats the heater of the second heating device so as to reach a second temperature higher than the first temperature, if the CPU receives a reinforcement start signal.

3 Claims, 2 Drawing Sheets

(56) References Cited

U.S. PATENT DOCUMENTS

| | | | |
|---|---|---|---|
| 2002/0148827 A1 | 10/2002 | Watanabe et al. | |
| 2006/0280417 A1* | 12/2006 | Sato | G02B 6/2551 385/134 |
| 2009/0263088 A1 | 10/2009 | Miyamori et al. | |
| 2015/0168649 A1* | 6/2015 | Fukuda | G02B 6/2558 219/490 |

FOREIGN PATENT DOCUMENTS

| | | |
|---|---|---|
| JP | H05-164933 A | 6/1993 |
| JP | 3293594 B2 | 6/2002 |
| JP | 2004-001257 A | 1/2004 |
| JP | 2007-286142 A | 11/2007 |
| JP | 2008-241222 A | 10/2008 |
| JP | 2009-300846 A | 12/2009 |

* cited by examiner

OPTICAL-FIBER FUSION-SPLICING DEVICE

TECHNICAL FIELD

The present invention relates to an optical-fiber fusion-splicing device which fuses and splices optical fibers with end faces brought into contact with each other and reinforces the fusion-spliced site by a heat-shrinkable resin.

BACKGROUND ART

In the related art, bringing the end faces of optical fibers into contact with each other and fusing the abutting parts by an electric discharge in a fusion device, and thereafter, performing reinforcement by heat-shrinking a heat-shrinkable resin covering a fusion-spliced site in a reinforcement device are performed (refer to Patent Documents 1 to 4).

PRIOR ART DOCUMENT

Patent Document

Patent Document 1: JP-A-2009-300846
Patent Document 2: JP-UM-A-4-24705
Patent Document 3: Japanese Patent No. 3293594
Patent Document 4: JP-UM-A-2-73602

SUMMARY OF INVENTION

Problem to be Solved

By carrying out, prior to a reinforcing operation, preheating of heating a heater of the reinforcement device to a predetermined temperature in advance, it is possible to shorten an operation time.

However, as described in Patent Document 1, for example, if preheating is started in a reinforcement device at a point of time when a power supply of a fusion-splicing device is turned on, the preheating is performed also during a waiting time for the reinforcing operation while a fusion-splicing operation is performed in a fusion device, and therefore, electric power is wastefully consumed.

The present invention has an object to provide an optical-fiber fusion-splicing device capable of shortening a reinforcing operation time while suppressing power consumption.

Means for Solving the Problem

According to an aspect of the present invention, there is provided an optical-fiber fusion-splicing device including:
a first heating device in which a fusion-splicing operation of heating and fusing abutting parts of at least a pair of optical fibers with end faces brought into contact with each other is performed;
a second heating device in which a reinforcing operation of heating and shrinking a heat-shrinkable resin which covers a site where the optical fibers are fusion-spliced to each other is performed; and
a control unit which controls the first heating device and the second heating device,
wherein the control unit preheats a heating unit of the second heating device so as to reach a predetermined first temperature, if the control unit receives a heating end signal from the first heating device, and thereafter, heats the heating unit of the second heating device so as to reach a second temperature higher than the first temperature, if the control unit receives a reinforcement start signal.

Effects of the Invention

According to the present invention, it is possible to provide an optical-fiber fusion-splicing device capable of shortening a reinforcing operation time while suppressing power consumption.

BRIEF DESCRIPTION OF DRAWINGS

FIG. 3 is a graph showing heating temperature characteristics in the second heating device, in a case where a start timing of preheating is set to be a point of time when a power supply of the optical-fiber fusion-splicing device is turned on.

DETAILED DESCRIPTION OF EMBODIMENTS

Figure 1:
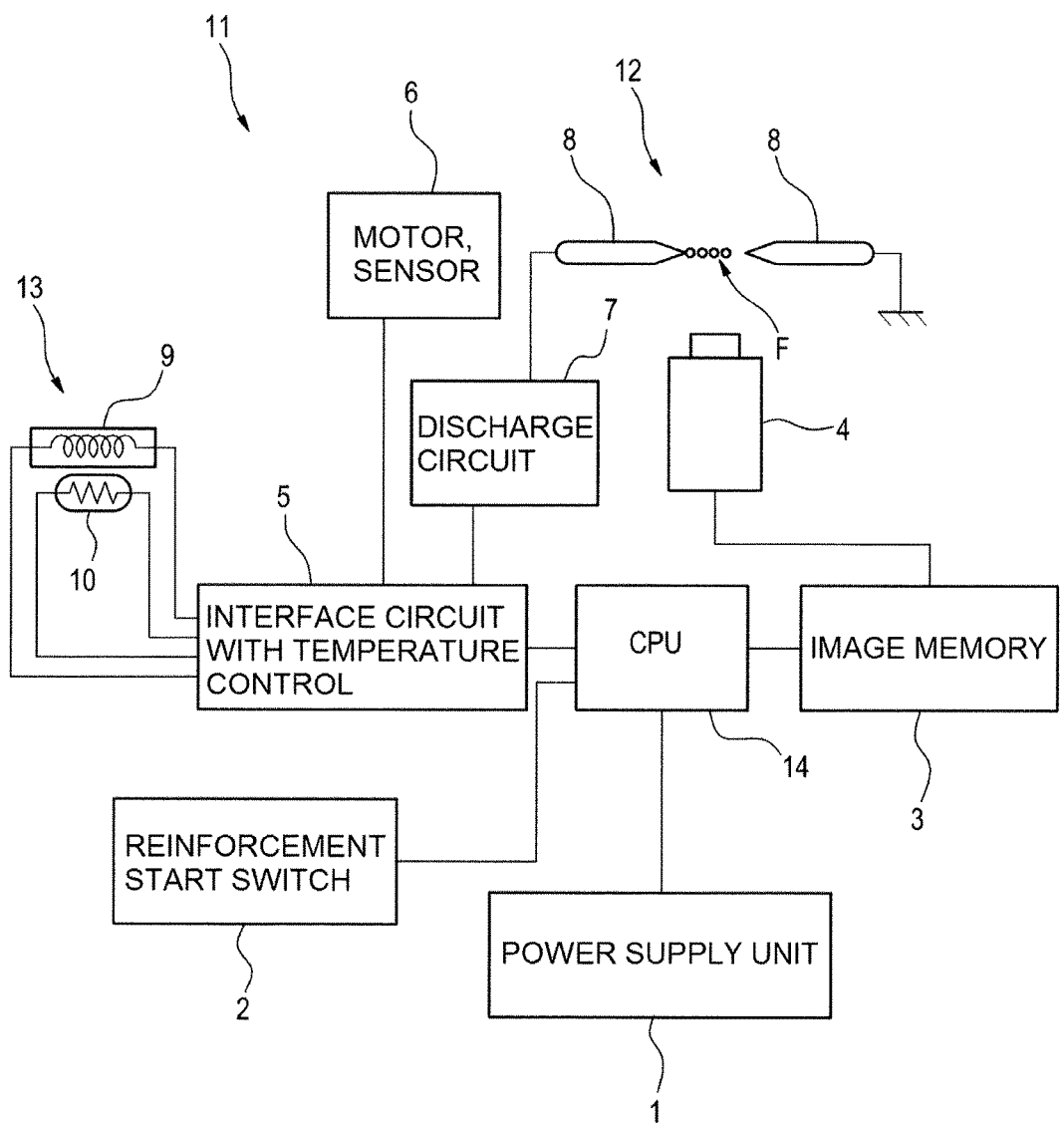
FIG. 1 is a schematic block diagram showing the configuration of an optical-fiber fusion-splicing device according to an embodiment of the present invention.

Summary of Embodiment of the Present Invention

First, a summary of an embodiment of the present invention will be described.

(1) According to an embodiment of the present invention, there is provided an optical-fiber fusion-splicing device including:
a first heating device in which a fusion-splicing operation of heating and fusing abutting parts of at least a pair of optical fibers with end faces brought into contact with each other is performed;
a second heating device in which a reinforcing operation of heating and shrinking a heat-shrinkable resin which covers a site where the optical fibers are fusion-spliced to each other is performed; and
a control unit which controls the first heating device and the second heating device,
wherein the control unit preheats a heating unit of the second heating device so as to reach a predetermined first temperature, if the control unit receives a heating end signal from the first heating device, and thereafter, heats the heating unit of the second heating device so as to reach a second temperature higher than the first temperature, if the control unit receives a reinforcement start signal.

According to the configuration of (1), the preheating of heating the heating unit of the second heating device at the first temperature is started after the end of the operation of fusion-splicing the optical fibers in the first heating device. In this way, it is possible to shorten a time before moving to the reinforcing operation by the second temperature in the second heating device and it is possible to increase the efficiency of the reinforcing operation. Furthermore, the preheating is started after the end of the fusion-splicing operation, and therefore, electric power is not consumed for the preheating during the fusion-splicing operation. Therefore, it is possible to suppress power consumption, as compared to, for example, a case where the preheating is started in the second heating device at a point of time when a power supply of the optical-fiber fusion-splicing device is turned on.

(2) The control unit may compare an actual heating amount by the preheating at the first temperature in the second heating device with a target heating amount of the reheating, which is set in advance, and change a heating condition at the second temperature, in a case where the actual heating amount is smaller than the target heating amount.

According to the configuration of (2), even in a case where the actual heating amount of the preheating by the first temperature is insufficient with respect to the target heating amount of the preheating, which is set in advance, the control unit changes the heating condition at the second temperature, whereby it is possible to compensate for the insufficiency of the actual heating amount of the preheating. In this way, it is possible to favorably perform the reinforcing operation at the second temperature.

Details of Embodiment of the Present Invention

Hereinafter, an example of an embodiment of an optical-fiber fusion-splicing device according to the present invention will be described with reference to the drawings. In addition, the present invention is not limited to the exemplification and it is intended to include all modifications within the meaning and the scope equivalent to those in the appended claims, as indicated by the claims.

FIG. 1 is a schematic block diagram showing the configuration of an optical-fiber fusion-splicing device 11 according to an embodiment of the present invention.

As shown in FIG. 1, the optical-fiber fusion-splicing device 11 according to this example is provided with a first heating device 12, a second heating device 13, and a CPU (an example of a control unit) 14. Further, the fusion-splicing device 11 is provided with a power supply unit 1, a reinforcement start switch 2, an image memory 3, a camera 4, an interface circuit with temperature control 5, a motor and sensor 6, and a discharge circuit 7.

The first heating device 12 has a discharge electrode 8, and in the first heating device 12, a fusion-splicing operation of heating and fusing abutting parts of optical fibers F with end faces brought into contact with each other, by arc discharge, is performed.

The second heating device 13 has a heater (an example of a heating unit) 9 and a thermistor 10, and in the second heating device 13, a reinforcing operation of heating and shrinking a heat-shrinkable resin which covers a site where the optical fibers F are fusion-spliced to each other is performed.

The fusion-splicing operation of the first heating device 12 and the reinforcing operation of the second heating device 13 are controlled by the CPU 14 and the interface circuit with temperature control 5.

The power supply unit 1 supplies electric power to the heater 9 through the interface circuit with temperature control 5, and supplies electric power to a pair of discharge electrodes 8 of the first heating device 12 through the interface circuit with temperature control 5 and the discharge circuit 7, under the control of the CPU 14. The pair of discharge electrodes 8 is disposed with distance therebetween, and the optical fibers F to be fusion-spliced are disposed in the vicinity of a line connecting the centers of the discharge electrodes 8. In the first heating device 12, the optical fibers F abutted with each other are fusion-spliced to each other by being heated by arc discharge which is generated between the discharge electrodes 8.

The camera 4 is disposed below the optical fibers F. The image memory 3 is connected to the camera 4, and image data of the magnified optical fibers F is stored in the image memory 3. As the camera 4, a CCD camera can be used, and as the image memory 3, a frame memory can be used.

The heater 9 heats a tubular heat-shrinkable resin disposed so as to cover the outer periphery in order to protect a fusion-spliced site where the optical fibers F are fusion-spliced to each other, thereby fixing the fusion-spliced site by the heat-shrinkable resin. The thermistor 10 measures a heating temperature of the heater 9 and adjusts the amount of electric power that the interface circuit with temperature control 5 supplies to the heater 9, based on the measured value. Further, the interface circuit with temperature control 5 is connected to the motor and sensor 6 and the discharge circuit 7, thereby enabling the control by the CPU 14.

Next, an example of the control by the CPU 14 of the optical-fiber fusion-splicing device 11 according to this example will be described.

Figure 2:
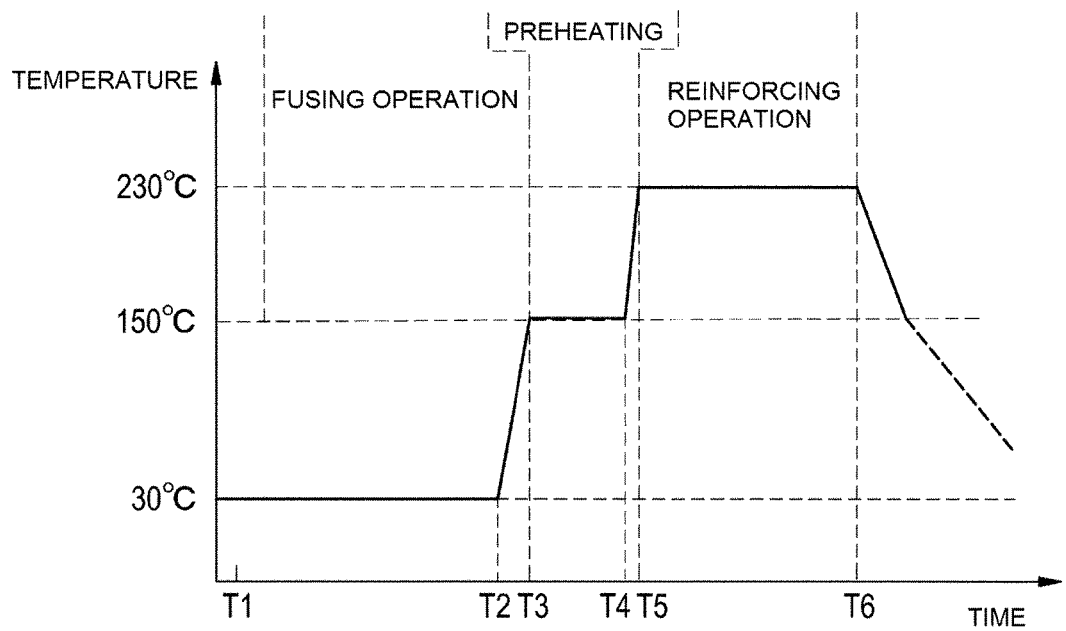
FIG. 2 is a graph showing heating temperature characteristics in a second heating device of the optical-fiber fusion-splicing device according to the embodiment of the present invention.

FIG. 2 is a graph showing heating temperature characteristics in the second heating device 13 of the optical-fiber fusion-splicing device 11 according to the embodiment of the present invention.

An operator turns on the power supply of the optical-fiber fusion-splicing device 11 (T1 in FIG. 2), thereby starting an operation of fusion-splicing the optical fibers F in the first heating device 12. In the fusion-splicing operation, specifically, the optical fibers F are disposed in the first heating device 12 and the end faces of the optical fibers F are brought into contact with each other. Then, a fusion start switch (not shown) of the optical-fiber fusion-splicing device 11 is pressed down. Then, power is supplied to the discharge electrodes 8 of the first heating device 12, whereby arc discharge is generated between the discharge electrodes 8, and the end faces of the optical fibers F are fusion-spliced to each other. A time of this fusion-splicing operation is in a range of 60 seconds to 90 seconds.

During the fusion-splicing operation, the CPU 14 does not perform the supply of power for preheating to the second heating device 13. Therefore, as shown in FIG. 2, the heater 9 of the second heating device 13 is maintained at a room temperature (in this example, 30° C.) without being preheated during the fusion-splicing operation including the time of electric discharge.

If the optical fibers F are fusion-spliced to each other and thus the fusion-splicing operation is ended, the CPU 14 receives a heating end signal from the first heating device 12. The CPU 14 which has received the heating end signal supplies power to the heater 9 of the second heating device 13 through the interface circuit with temperature control 5 in order to preheat the heater 9 of the second heating device 13 (T2 in FIG. 2). Then, the heater 9 rises in temperature to a predetermined first temperature (in this example, 150° C.) (T3 in FIG. 2), thereby being preheated. Further, a time (T3–T2) it takes for the temperature of the heater 9 supplied with power to rise to the first temperature is about 3 seconds, and a time (T4–T3) required for reheating at the first temperature is about 5 seconds.

Thereafter, in order to perform reinforcement of the fusion-spliced site of the optical fiber F, the operator moves the tubular heat-shrinkable resin mounted on the optical fiber F on one side in advance, thereby disposing the heat-shrinkable resin so as to cover the fusion-spliced site of the optical fiber F and a reinforcement material along the fusion-spliced site. Then, the operator sets the fusion-spliced site of the optical fiber F covered with the heat-shrinkable resin on the second heating device 13 and presses the reinforcement start switch 2 down in order to start a reinforcing operation. Then, the CPU 14 receives a reinforcement start signal from the second heating device 13.

The CPU 14 which has received the reinforcement start signal supplies power to the heater 9 of the second heating device 13 through the interface circuit with temperature control 5 in order to heat the heater 9 of the second heating device 13 at a second temperature (T4 in FIG. 2). Then, the temperature of the heater 9 rises to the predetermined second temperature (in this example, 230° C.) (T5 in FIG. 2). After the elapse of a predetermined heating time when the heat-shrinkable resin is sufficiently shrunk, the power supply to the heater 9 of the second heating device 13 is ended (T6 in FIG. 2), whereby the reinforcing operation is ended.

The second temperature is set to a temperature higher than a temperature (for example, 110° C.) at which the heat-shrinkable resin shrinks. The heater 9 reaches the second temperature, whereby the heat-shrinkable resin reaches a temperature higher than a shrinkage temperature and shrinks, thereby coming into close contact with the outer peripheries of the fusion-spliced site of the optical fiber F and the reinforcement material. In this way, the fusion-spliced site of the optical fiber F along which the reinforcement material is disposed is covered with and reinforced by the heat-shrinkable resin. At this time, the second temperature is set to a temperature higher than a temperature at which the heat-shrinkable resin shrinks, and therefore, the heat-shrinkable resin is reliably shrunk by the reinforcing operation at the second temperature, thereby being able to being brought into close contact with the fusion-spliced site of the optical fiber F.

Figure 3:
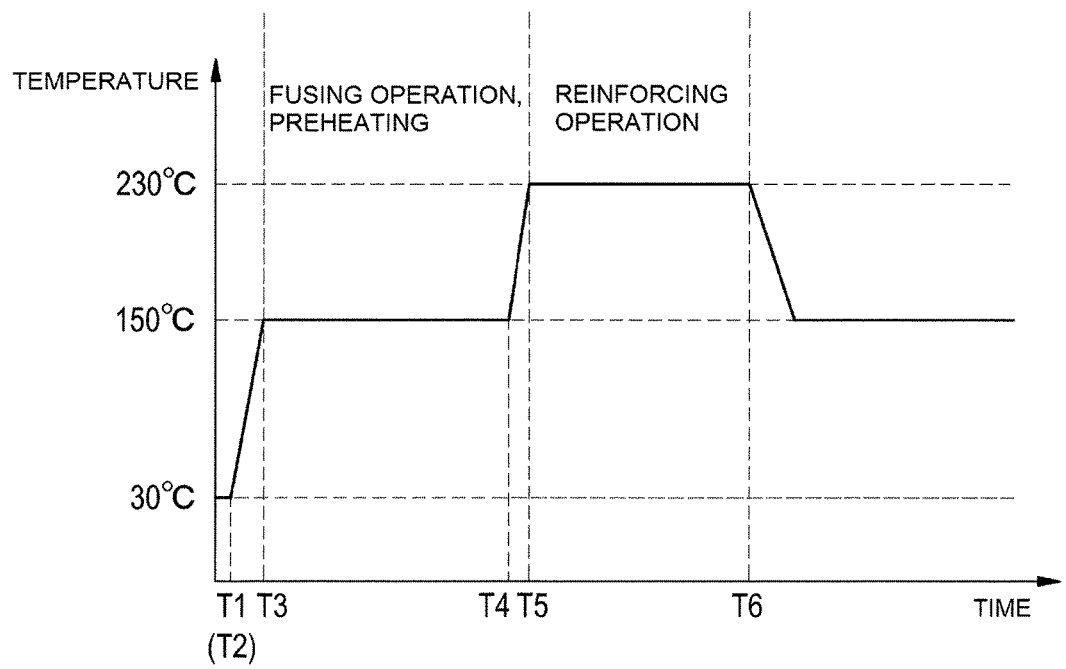

FIG. 3 is a graph showing heating temperature characteristics in the second heating device 13, in a case where a start timing of the preheating is set to be a point of time when the power supply of the optical-fiber fusion-splicing device 11 is turned on.

As shown in FIG. 3, in this control, the preheating is started in the second heating device 13 at a point of time (T1 in FIG. 3) when the power supply of the optical-fiber fusion-splicing device 11 is turned on, whereby the temperature of the heater 9 rises from the room temperature (30° C.) to the first temperature (150° C.). Then, in this control, the preheating of heating the heater 9 at the first temperature in the second heating device 13 is continued also during a waiting time for the reinforcing operation until the operation of fusion-splicing the optical fibers F is ended in the first heating device 12. For this reason, in this control, in the second heating device 13, the preheating is performed more than necessary, and thus electric power is wastefully consumed.

Further, for example, there is also a configuration in which the preheating is started by a signal from a sensor which detects the opening and closing of a windshield cover provided at the first heating device 12 (refer to Patent Document 1). However, the processes of the setting of the optical fibers F on the first heating device 12, the fusion-splicing operation, the setting of the optical fibers F after the fusion-splicing on the second heating device 13, and the reinforcing operation of the fusion-spliced site are not necessarily performed in a series. Therefore, even in a case of starting the preheating by a signal from a sensor which detects the opening and closing of the windshield cover, the preheating is wastefully performed, and thus there is a case where consumed power is wasted.

In contrast, according to the optical-fiber fusion-splicing device 11 according to this embodiment, the preheating of heating the heater 9 of the second heating device 13 at the first temperature is started at the end of the operation of fusion-splicing the optical fibers F in the first heating device 12. In this way, it is possible to shorten a time before moving to the reinforcing operation by the second temperature in the second heating device 13, and it is possible to increase the efficiency of the reinforcing operation.

Further, according to the optical-fiber fusion-splicing device 11 according to this embodiment, the preheating is started after the end of the fusion-splicing operation, and therefore, electric power is not consumed for the preheating during the fusion-splicing operation. Therefore, it is possible to reduce power consumption as much as possible, as compared to a case where the preheating is started in the second heating device 13 at a point of time when the power supply of the optical-fiber fusion-splicing device 11 is turned on. In this way, it is possible to increase the number of times of the fusion-splicing operation and the number of times of the reinforcing operation per one-time charge in, for example, a case where the optical-fiber fusion-splicing device 11 is operated by a battery.

Further, the preheating is started in response to the heating end signal from the first heating device 12, and therefore, as compared to a case of starting the preheating by pressing a separate switch for starting the preheating down, a switch for starting the preheating is not required apart from the reinforcement start switch 2, and trouble of pressing the switch down can be saved.

Incidentally, in a case where after the operation of fusion-splicing the optical fibers F is ended and the second heating device 13 is preheated at the first temperature, the reinforcement start switch 2 is pressed down earlier (earlier than T2), there is a case where the actual heating amount of the preheating by the first temperature is more insufficient than the target heating amount of the preheating, which is set in advance. For this reason, the CPU 14 changes a heating condition at the second temperature in order to compensate for the insufficiency of the actual heating amount of the preheating, which occurs in a case where the reinforcement start switch 2 is pressed down earlier after the preheating, and then performs the reinforcing operation. Further, the target heating amount of the preheating is a heating amount at which the preheating is reliably performed by a heating condition at the first temperature, which is set in advance.

Specifically, first, the actual heating amount by the preheating at the first temperature in the second heating device 13 is calculated. The calculation of the actual heating amount is calculated from, for example, the actual preheating time and preheating temperature. Thereafter, the calculated actual heating amount is compared with the target heating amount of the preheating, which is set in advance. Then, in a case where the actual heating amount is smaller than the target heating amount, the heating condition at the second temperature is changed and the reinforcing operation is performed. As a way of changing the heating condition, for example, the second temperature at the time of the reinforcing operation is increased (set to be, for example, 235° C.), or a reinforcing operation time at the second temperature is extended by several seconds. Further, a configuration may be made in which the second temperature is increased and the reinforcing operation time at the second temperature is extended.

By performing the above-described control, even in a case where the actual heating amount of the preheating by the first temperature is insufficient with respect to the target heating amount of the preheating, which is set in advance, it is possible to compensate for the insufficiency of the actual heating amount of the preheating. In this way, it is possible to favorably perform the reinforcing operation at the second temperature.

Further, after the reinforcement start switch 2 is pressed down earlier, the preheating may be continued without pausing until the actual heating amount of the preheating reaches the target heating amount, thereby compensating for the insufficiency of the actual heating amount of the preheating. However, in the above-described control to compensate for the insufficiency of the actual heating amount of the preheating by changing the heating condition in the reinforcing operation performing heating at the second temperature higher than the first temperature, it is possible to further shorten the reinforcing operation time than in the control to compensate for the insufficiency of the actual heating amount of the preheating by continuing the preheating until the actual heating amount of the preheating reaches the target heating amount.

Further, in the above-described embodiment, the reinforcement start switch 2 is provided and the reinforcing operation is started at a point of time when the reinforcement start switch 2 is pressed down. However, the reinforcing operation in the second heating device 13 may be started other timing. For example, a configuration may be made in which a sensor for detecting opening and closing is provided at a cover (not shown) provided at the second heating device 13 and the reinforcing operation is started with a signal from the sensor, which is transmitted when the cover is closed, as a reinforcement start signal.

In addition, specific heating temperature and heating time in the second heating device 13 in the above-described embodiment are an example, and the heating temperature and the heating time in the second heating device 13 are set according to various conditions.

The present invention has been described in detail with reference to a specific embodiment. However, it will be apparent to those skilled in the art that various changes or modifications can be made without departing from the spirit and the scope of the present invention.

This application is based on Japanese Patent Application No. 2014-013549 filed on Jan. 28, 2014, the contents of which are incorporated herein by reference.

The invention claimed is:

1. An optical-fiber fusion-splicing device comprising:
   a first heating device in which a fusion-splicing operation of heating and fusing abutting parts of at least a pair of optical fibers with end faces brought into contact with each other is performed;
   a second heating device in which a reinforcing operation of heating and shrinking a heat-shrinkable resin which covers a site where the optical fibers are fusion spliced to each other is performed; and
   a control unit which controls the first heating device and the second heating device, and is programmed to:
   preheat a heating unit of the second heating device to reach a predetermined first temperature in response to a heating end signal from the first heating device, and
   thereafter, heat the heating unit of the second heating device to reach a second temperature higher than the first temperature in response to a reinforcement start signal.

2. The optical-fiber fusion-splicing device according to claim 1, wherein the control unit is programmed to:
   compare an actual heating amount by the preheating at the first temperature in the second heating device with a target heating amount of the reheating, which is set in advance, and
   change a heating condition at the second temperature, in a case where the actual heating amount is smaller than the target heating amount.

3. The optical-fiber fusion-splicing device according to claim 1, wherein during the fusion-splicing operation, the control unit is programmed to not preheat the heating unit of the second heating device such that the second heating device is off.

* * * * *